US006819920B2

(12) United States Patent
Shi et al.

(10) Patent No.: US 6,819,920 B2
(45) Date of Patent: Nov. 16, 2004

(54) METHOD AND APPARATUS FOR ACCESSING SUPPLEMENTARY SERVICES WITH A MULTI-MODE WIRELESS DEVICE

(75) Inventors: Guangming Shi, San Diego, CA (US); Hai Qu, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 120 days.

(21) Appl. No.: 10/198,711

(22) Filed: Jul. 16, 2002

(65) Prior Publication Data

US 2004/0203647 A1 Oct. 14, 2004

Related U.S. Application Data

(60) Provisional application No. 60/384,157, filed on May 29, 2002.

(51) Int. Cl.[7] ............................................. H04M 11/00
(52) U.S. Cl. .................. 455/414.1; 455/417; 455/553.1
(58) Field of Search ........................... 455/414.1, 414.3, 455/422.1, 432.3, 456.3, 461, 403, 404.2, 418, 437, 566, 435.2, 553.1, 127.4

(56) References Cited

U.S. PATENT DOCUMENTS

| | | | | | |
|---|---|---|---|---|---|
| 5,878,349 | A | * | 3/1999 | Dufour et al. | 455/438 |
| 6,091,948 | A | * | 7/2000 | Carr et al. | 455/414.1 |
| 6,249,676 | B1 | * | 6/2001 | Alperovich et al. | 455/427 |
| 2002/0099799 | A1 | * | 7/2002 | Kolsky | 709/219 |
| 2002/0132636 | A1 | * | 9/2002 | Stockhusen | 455/553 |

* cited by examiner

*Primary Examiner*—Fan Tsang
(74) *Attorney, Agent, or Firm*—Phillip R. Wadsworth; Thien T. Nguyen; Erin P. Madill

(57) ABSTRACT

A method, apparatus, and computer-readable media for accessing supplementary services from a wireless device in a multi-mode environment is disclosed. A master set of service codes for the multi-mode environment is provided. The master set of service codes is associated with supplementary services offered by a plurality of wireless networks that are compatible with the wireless device. At least one service code from the master set of service codes is mapped to a corresponding at least one network-specific service code to request at least one supplementary service of one of the plurality of wireless networks.

25 Claims, 4 Drawing Sheets

METHOD AND APPARATUS FOR ACCESSING SUPPLEMENTARY SERVICES WITH A MULTI-MODE WIRELESS DEVICE

CROSS REFERENCE

This application claims priority of U.S. Provisional Application Ser. No. 60/384,157, filed May 29, 2002 entitled "Method and Apparatus For Accessing Supplementary Services With A Multi-Mode Wireless Device."

BACKGROUND

1. Field

The present invention relates to communications of data, and more particularly to communications for accessing supplementary services with a multi-mode wireless device.

2. Background

Supplementary services are widely used in wireless networks. Supplementary services (known as "cellular features" in CDMA and TDMA specifications), such as call forwarding, call waiting, call barring, etc., enhance the basic voice call services of typical wireless service plans. Supplementary services are accessed by service codes and man-machine interface (MMI) procedures. A service code is a special phone number composed of 0, 1, . . . 9, and # with a predefined format according to each of the wireless system standards. For example, in CDMA, to implement call forwarding, the user enters the digit string "*68", and then presses the SEND or TALK key to originate a call to the network with that digit string. Each type of wireless system has unique service codes. These service codes and MMI procedures standardize the process for sending requests to the network to activate, deactivate, interrogate, register, or erase one or more of the supplementary services. If a particular supplementary service is active, a user invokes a network-specific procedure to enable the service, such as forwarding an incoming call for example.

A problem arises for users of a multi-mode wireless device, i.e. a wireless device compatible for operations with more than one wireless system. Since different wireless systems employ distinct service codes and MMI procedures, a user would need to know what system is currently being used by the wireless device. Further, if one wireless system becomes out of range or otherwise fails for any reason and a different wireless system is used during the process, the steps already made for supplementary services are not guaranteed to be accepted by the new wireless system.

SUMMARY

Embodiments disclosed herein address the above stated needs by providing a novel and improved method, apparatus, and computer-readable medium for accessing supplementary services offered by each of a number of wireless systems. In accordance with various aspects of the invention, a method for accessing supplementary services from a multi-mode wireless device includes providing a master set of service codes associated with supplementary services offered by a plurality of wireless systems that are compatible with the wireless device. The method further includes mapping at least one service code from the master set of service codes to a corresponding network-specific service code to request at least one supplementary service from the plurality of wireless systems.

DETAILED DESCRIPTION

Figure 1:
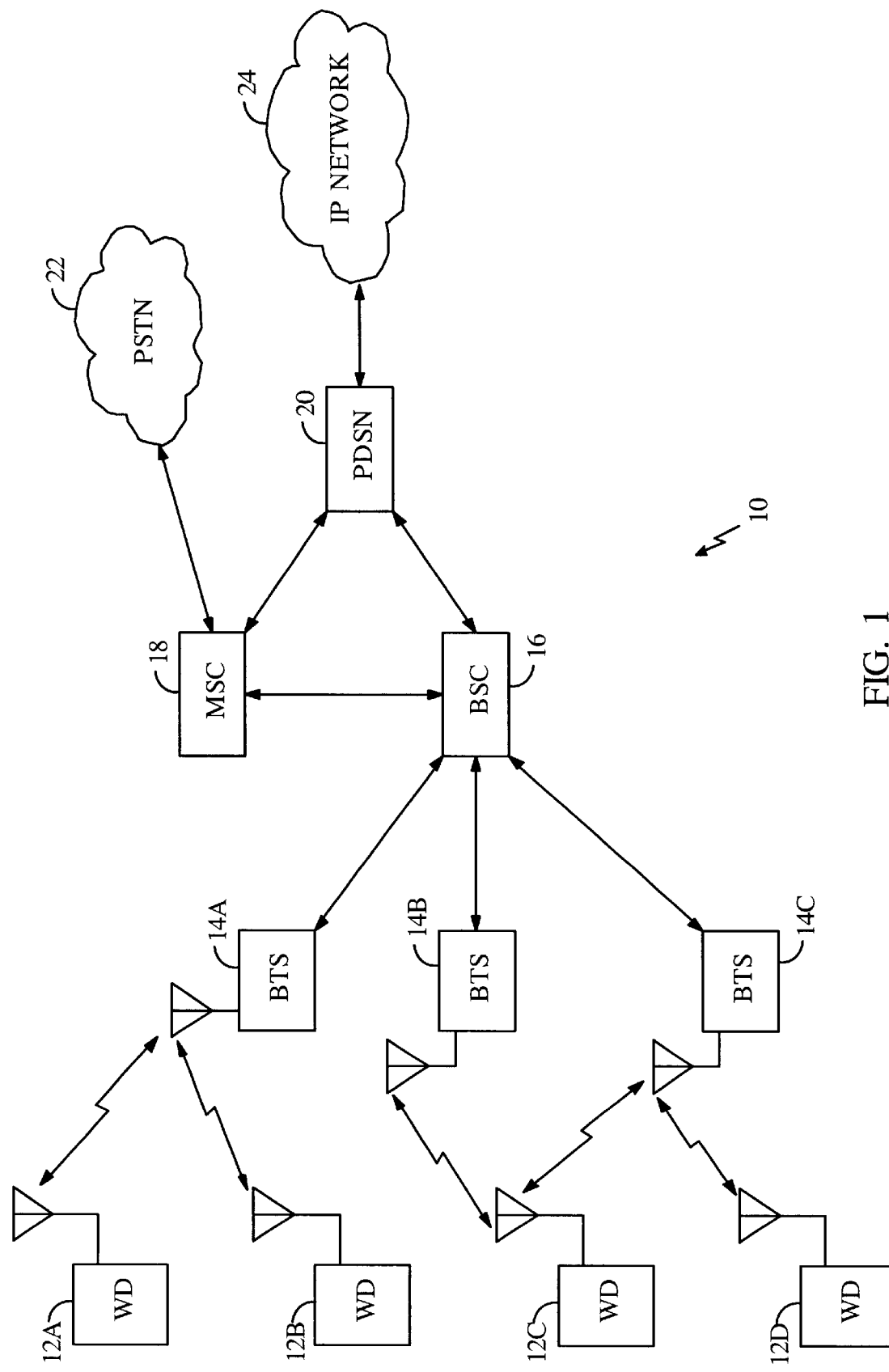
FIG. 1 illustrates a block diagram of a wireless communication network capable of operating in accordance with various aspects of the invention.

FIG. 1 illustrates a wireless communication system 10 capable of operating in accordance with various aspects of the invention. The wireless communication system 10 generally includes a plurality of wireless devices (also called remote stations, subscriber units, mobile stations or user equipment) 12a–12d, a plurality of base stations (also called base station transceivers (BTSs) or Node B) 14a–14c, a base station controller 16 (BSC) (also called radio network controller or packet control function), a mobile switching center (MSC) or switch 18, and a public switched telephone network (PSTN) 22. For simplicity, FIG. 1 shows four wireless devices 12a–12d, three base stations 14a–14c, one BSC 16, and one MSC 18. It would be understood by those skilled in the art that there could be any number of wireless devices 12, base stations 14, BSCs 16, and MSCs 18.

In one embodiment, the wireless communication system 10 is a packet data service network. The wireless devices 12a–12d may be any of a number of different wireless communication devices such as a portable phone, a cellular telephone that is connected to a laptop computer running IP-based Web-browser applications, a cellular telephone with associated hands-free car kits, a personal data assistant (PDA) running IP-based Web-browser applications, a wireless communication module incorporated into a portable computer, or a fixed location communication module such as a wireless local loop or meter reading system. In the most general embodiment, wireless devices may be any type of communication unit.

The wireless devices 12a–12d may be configured for communicating in accordance with one or more wireless packet data protocols described in, for example, the EIA/TIA/IS-707 standard. In a particular embodiment, the wireless devices 12a–12d generate IP packets destined for the IP network 24, and encapsulate the IP packets into frames using a point-to-point protocol (PPP). The wireless devices 12a–12d may also be configured as a multi-mode wireless device (MWD) for communicating with more than one wireless system by using different wireless communication modes. The different wireless communication modes include, for example, various combinations of CDMA1x/1xEV (CDMA1x Evolution), GSM/GPRS, UMTS, etc.

During operation of the basic services of the wireless communication system 10, the base stations 14a–14c receive and demodulate sets of uplink signals from various wireless devices 12a–12d engaged in telephone calls, Web browsing, or other data communications. Each uplink signal received by base station 14a–14c is processed within the receiving base station. Each base station 14a–14c may communicate with a plurality of wireless devices 12a–12d by modulating and transmitting sets of downlink signals to the wireless devices 12a–12d. For example, as shown in FIG. 1, the base station 14a communicates with first and second wireless devices 12a, 12b simultaneously, and the base station 14c communicates with third and fourth wireless devices 12c, 12d simultaneously.

The received packets by the base station 14a–14c are forwarded to the BSC 16, which provides call resource allocation and mobility management functionality including the orchestration of soft handoffs of a call for a particular wireless device from one base station to another base station. For example, a wireless device 12c is communicating with two base stations 14b, 14c simultaneously. Eventually, when the wireless device 12c moves far enough away from one of the base stations, the call will be handed off to the other base station. If the transmission is a conventional telephone call, the BSC 16 routes the received data to the MSC 18, which provides additional routing services for interface with the PSTN 22.

Conventionally, two or more wireless networks exist within wireless communication system 10. Each wireless network may operate according to a communication mode. The communication modes support similar basic services as well as similar supplementary services, but each mode has distinct MMI procedures and service codes. For example BTS 14b may operate in accordance with one type of system standard, and BTS 14c in accordance with another. In case the wireless device 12c is a multi-mode wireless device (MWD), switching the communication from BTS 14b to 14c or from 14c to 14b may require substantial operational change within the multi-mode wireless device. Therefore, switching between different communication modes may make using supplementary services laborious and time consuming.

Figure 2:
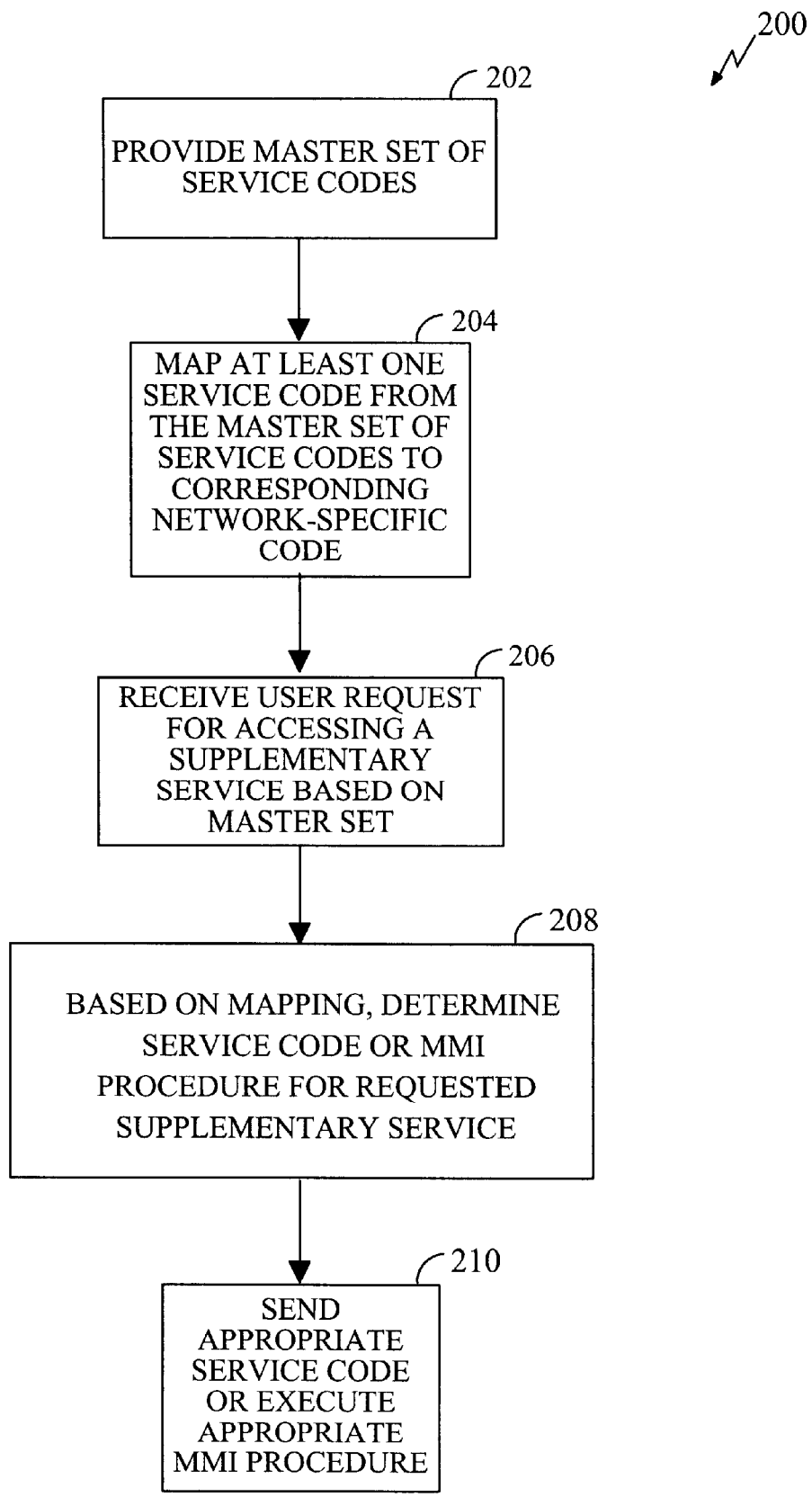
FIG. 2 illustrates a flow chart for accessing supplementary services in a multi-mode wireless device in accordance with various aspects of the invention.

FIG. 2 is a flow chart 200 for enabling access to supplementary services by a uniform set of codes and procedures. Various steps in flow chart 200 is preferably executed by a MWD. At step 202, the MWD provides a master set of service codes. The master set of service codes represents all of the possible supplementary services offered by networks that are compatible with the MWD. The master set of service codes is based on the service codes provided by different wireless networks. For example, the master set of service codes may be based on GSM/UMTS service codes and MMI procedures. At step 204, the MWD maps the master set of service codes to corresponding service codes of each network or communication mode supported by the MWD. Alternatively, the MWD only maps one or more selected service codes to a corresponding number of service codes of a servicing or selected network or communication mode. The mapping is preferably in response to a request from a user currently using the servicing or selected communication mode.

At step 206, the MWD receives a user request to access at least one supplementary service. As stated before, accessing includes such functions as activating, deactivating, interrogating, and registering, etc. The request is based on the master set of service codes, and is entered either via a user interface or by the unique code or procedure on which the master set of service codes is based. Based on the mapping, the MWD determines the network-specific service code and/or MMI procedure which needs to be invoked in order to produce the desired access result, at step 208. At step 210, the MWD sends the appropriate service code, or executes the appropriate MMI procedure, to fulfill the user's request.

Figure 3:
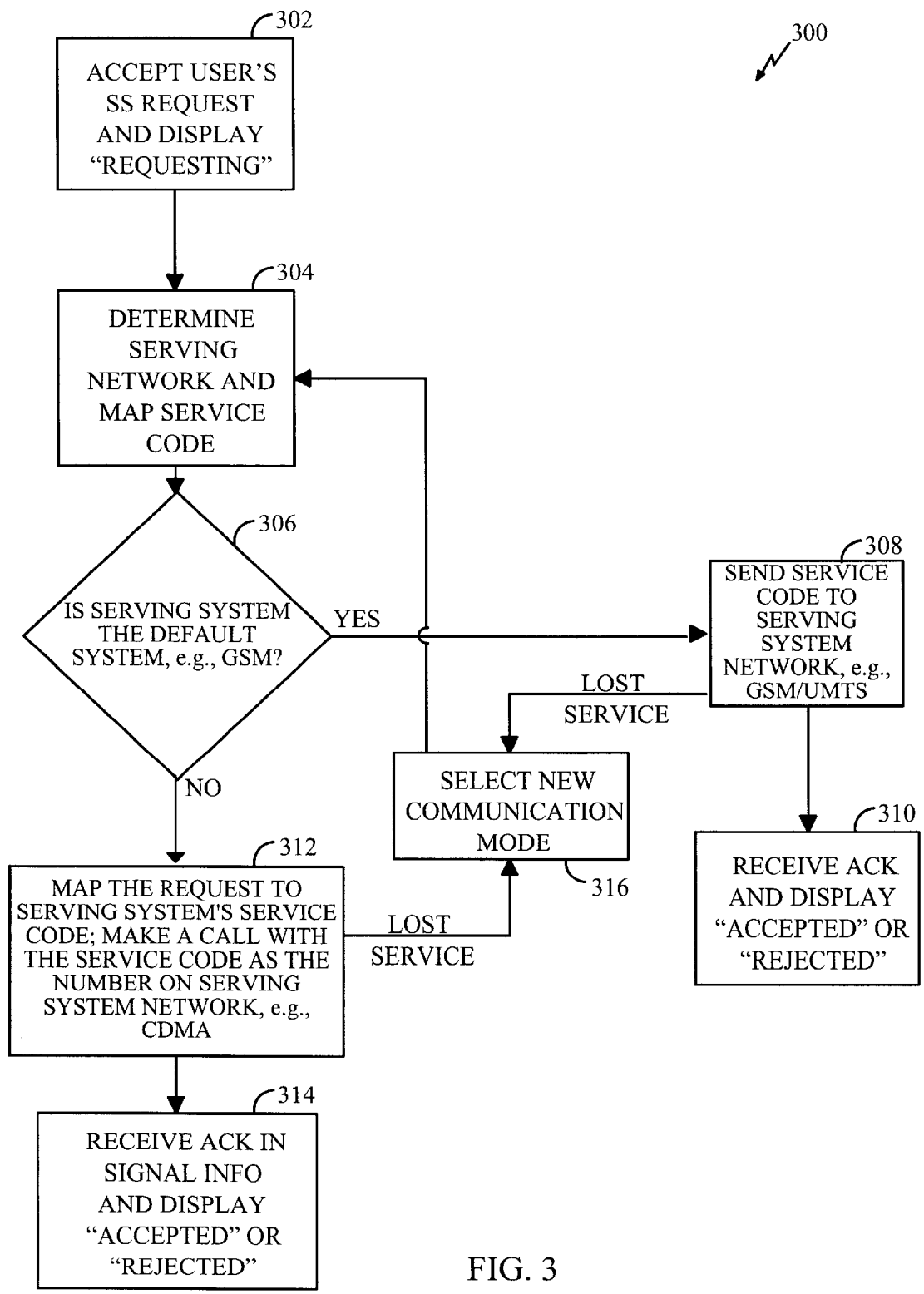
FIG. 3 illustrates a flow chart for processing user requests for supplementary services according to various aspects of the invention.

FIG. 3 is a flowchart 300 illustrating accessing supplemental services with a MWD, according to various aspects of the invention. At step 302, a user makes a supplementary service request by typing a service code from the master set of service codes, and pressing the SEND key. Alternatively, the user may enter the request by selecting a supplementary service menu option on a user interface. At step 304, the MWD determines the serving network (i.e. current active wireless network), and maps the requested service code from the master set of service codes to the network-specific service code of the serving network.

At decision step 306, the MWD determines whether the serving system is the default system for the master set of service codes, i.e., GSM in an example above. If the serving system is the default system, the service code corresponding to the request is sent to the serving system network, at step 308. At step 310, the MWD receives an acknowledgement, and displays to the user that the request was either "accepted" or "rejected."

If the serving system is not associated with the master set of service codes, the MWD maps the request to the serving system's service code and makes a call on the serving system's network at step 312. The MWD receives an acknowledgement of acceptance or rejection at step 314. In case of lost service, at step 316, the MWD selects a new communication mode for communicating to a different wireless network. Once a new network is acquired and the MWD is operating according to the new communication mode, the method returns to step 304 and the mapping is executed again.

Figure 4:
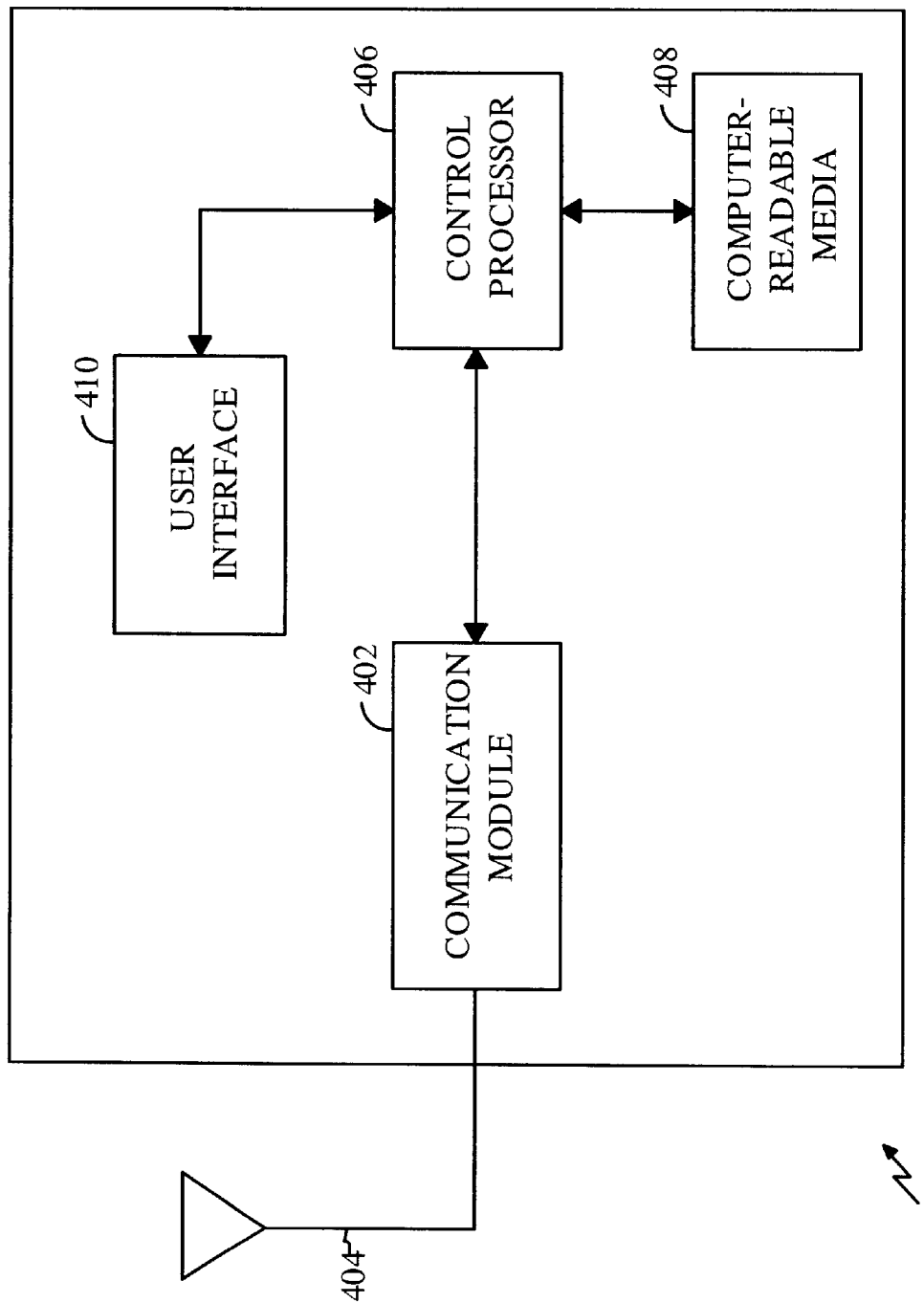
FIG. 4 illustrates a block diagram of a multi-mode wireless device for accessing supplementary services in accordance with various aspects of the invention.

FIG. 4 is a simplified block diagram of a MWD 400 for accessing supplementary services offered by more than one wireless network or communication mode. The MWD 400 includes a communication module 402 that enables communication with different wireless networks while using a corresponding communication mode. The communication module 402 sends and receives radio-frequency signals via antenna 404. The MWD 400 includes a user interface 410 for receiving commands, requests, instructions, and data from a user, and for providing information to the user via, for example, a display in the MWD. A user may enter requests for supplementary services to the user interface 410. The user interface can include, as an example, a display, keypad or touchpad, or light emitting diodes (LEDs), etc.

The MWD 400 also includes a control processor 406 and computer-readable media 408. The computer-readable media 408 stores one or more software modules for execution by the control processor 406. For example, the computer-readable media 408 stores the master set of service codes and MMI procedures, and the network-specific service codes and MMI procedures for each supported wireless network. The control processor 406 receives the user requests for supplementary services from the user interface 410, maps at least one service code from the set to a corresponding service code of a serving system, if different, and executes the selected network-specific service code or MMI procedure to send the request to the serving wireless network.

Those of skill would further appreciate that the various illustrative logical blocks, modules, functional blocks, and algorithm steps described in connection with the embodiments disclosed herein may be implemented as electronic hardware, computer software stored on computer-readable media, or combinations thereof. To clearly illustrate this interchangeability of hardware and software, various illustrative components, blocks, modules, circuits, and steps have been described above generally in terms of their functionality.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a wireless device. In the alternative, the processor and the storage medium may reside as discrete components in a user terminal connected with the wireless device.

What is claimed is:

1. A method for accessing supplementary services with a multi-mode wireless communication device operable within a plurality of wireless networks comprising a serving network and a default network, the method comprising:
   providing a master set of service codes associated with the supplementary services available from the default wireless network, at least two wireless networks having different network-specific service codes associated with at least one substantially similar supplementary service;
   receiving a request for said at least one supplementary service associated with at least one service code;
   determining if the serving network is the default network; and
   if the serving network is not the default network, mapping the at least one service code from the master set of service codes to a network-specific service code associated with a request to access at least one supplementary service from the serving network.

2. The method as set forth in claim 1, further comprising:
   providing a user interface for displaying menu options based on the master set of service codes for a user to request said at least one supplementary service.

3. The method as set forth in claim 1, further comprising:
   invoking a man-machine interface (MMI) procedure related to the network-specific service code to provide the requested at least one supplementary service from said one of the plurality of wireless networks to said multi-mode wireless communication device.

4. The method of claim 1, wherein another wireless network of the plurality of wireless networks uses Time Division Multiple Access (TDMA) communication.

5. The method of claim 1, wherein another wireless network of the plurality of wireless networks uses a Global System for Mobile Communications (GSM).

6. The method of claim 1, wherein another wireless network of the plurality of wireless networks uses General Packet Radio Service (GPRS).

7. The method of claim 1, wherein another wireless network of the plurality of wireless networks uses Universal Mobile Telecommunications System (UMTS) communication.

8. The method of claim 1, wherein said supplementary services comprise at least two of call forwarding, call waiting, and call barring.

9. The method of claim 1, wherein said request to access at least one supplementary service comprises at least one of activating, deactivating, interrogating, registering and erasing a supplementary service.

10. The method of claim 1, wherein the master set of service codes comprise service codes for GSM/UMTS, and wherein the network-specific service codes comprise cellular feature codes for CDMA/TDMA, and wherein mapping comprises:
    mapping the at least one service code from the GSM/UMTS service codes to a CDMA/TDMA service code, the CDMA/TDMA service code being associated with a request to access at least one supplementary service from one of a CDMA/TDMA wireless network.

11. The method of claim 1, wherein providing comprises:
    providing a menu comprising a master set of service codes associated with the supplementary services available from the default wireless network, at least two wireless networks having different network-specific service codes as associated with at least one substantially similar supplementary service.

12. A multi-mode wireless communication device configured to access supplementary services and operable within a plurality of wireless networks comprising a serving network and a default network, the device comprising:
    computer-readable media configured to store a master set of service codes, wherein the master set of service codes are associated with supplementary services provided by the plurality of wireless networks that are compatible with said multi-mode wireless communication device;
    a user interface configured to receive a user request for the at least one supplementary service associated with at least one service code, the user request being based on the master set of service codes; and
    a control processor configured to determine if the serving network is the default network, wherein if the serving network is not the default network the control processor maps the at least one service code from the master set of service codes to a corresponding at least one network-specific service code associated with a request to access at least one supplementary service of the serving network.

13. The device as set forth in claim 12, wherein the user interface is further configured to display menu options based on the master set of service codes.

14. The device as set forth in claim 12, further comprising:
    means for invoking a man-machine interface (MMI) procedure, related to the at least one network-specific service code, to send the at least one network-specific service code to said one of the plurality of networks.

15. The device of claim 12, wherein another wireless network of the plurality of wireless networks uses Time Division Multiple Access (TDMA) communication.

16. The device of claim 12, wherein another wireless network of the plurality of wireless networks uses Global System for Mobile Communications (GSM).

17. The device of claim 12, wherein another wireless network of the plurality of wireless networks uses General Packet Radio Service (GPRS).

18. The device of claim 12, wherein another wireless network of the plurality of wireless networks uses Universal Mobile Telecommunications System (UMTS) communication.

19. The device of claim 12, wherein said supplementary services comprise at least two of call forwarding, call waiting, and call barring.

20. The device of claim 12, wherein said request to access at least one supplementary service comprises at least one of activating, deactivating, interrogating, registering and erasing a supplementary service.

21. The device of claim 12, wherein the master set of service codes comprise service codes for GSM/UTMS, and wherein the network-specific service codes comprise cellular feature codes for CDMA/TDMA, and wherein the control processor maps the at least one service code from the GSM/UMTS service codes to a CDMA/TDMA service code, the CDMA/TDMA service code being associated with a request to access at least one supplementary service from one of a CDMA/TDMA wireless network.

22. The device of claim 12, wherein the computer-readable media is configured to store a menu comprising a master set of service codes associated with the supplementary services available from the default wireless network, and further comprising:

a graphical user interface that displays the menu.

23. A multi-mode wireless communication device operable in a plurality of wireless networks comprising a serving network and a default network, the device comprising:

means for providing a master set of service codes associated with supplementary services available from the plurality of wireless networks, at least two wireless networks having different network-specific service codes associated with at least one substantially similar supplementary service;

means for receiving a request for said at least one supplementary service associated with at least one service code;

means for determining if the serving network is the default network; and if the serving network is not the default network, means for mapping the at least one service code from the master set of service codes to a network-specific service code associated with a request to access at least one supplementary service from the serving network.

24. The device as set forth in claim 23, further comprising:

a user interface means for displaying menu options based on the master set of service codes for a user to request said at least one supplementary service.

25. The device as set forth in claim 23, further comprising:

means for invoking a man-machine interface (MMI) procedure related to the network-specific service code to provide the requested at least one supplementary service from said one of the plurality of wireless networks to said multi-mode wireless communication device.

* * * * *